(12) United States Patent
Serry et al.

(10) Patent No.: US 12,392,334 B1
(45) Date of Patent: Aug. 19, 2025

(54) ELECTROMAGNETICALLY ACTUATED 3D PRINTED MICROPUMP

(71) Applicant: The American University in Cairo, New York, NY (US)

(72) Inventors: Mohamed Yousef Serry, New Cairo (EG); Mostafa Sedky, New Cairo (EG)

(73) Assignee: The American University in Cairo, New York, NY (US)

( * ) Notice: Subject to any disclaimer, the term of this patent is extended or adjusted under 35 U.S.C. 154(b) by 0 days.

(21) Appl. No.: 18/234,527

(22) Filed: Aug. 16, 2023

Related U.S. Application Data

(63) Continuation of application No. 18/130,039, filed on Apr. 3, 2023, now abandoned.

(60) Provisional application No. 63/331,310, filed on Apr. 15, 2022.

(51) Int. Cl.
| | |
|---|---|
| *F04B 43/04* | (2006.01) |
| *F04B 49/22* | (2006.01) |
| *F04B 51/00* | (2006.01) |
| *B33Y 80/00* | (2015.01) |

(52) U.S. Cl.
CPC ............ *F04B 43/043* (2013.01); *F04B 49/22* (2013.01); *F04B 51/00* (2013.01); *B33Y 80/00* (2014.12)

(58) Field of Classification Search
CPC ......... F04B 43/043; F04B 49/22; F04B 51/00
See application file for complete search history.

(56) References Cited

U.S. PATENT DOCUMENTS

| | | | |
|---|---|---|---|
| 2005/0092662 A1* | 5/2005 | Gilbert | B01L 3/50273 210/97 |
| 2005/0123420 A1* | 6/2005 | Richter | F04B 43/14 417/505 |
| 2011/0309552 A1* | 12/2011 | Amirouche | A61M 5/16804 264/331.11 |

* cited by examiner

*Primary Examiner* — Connor J Tremarche
(74) *Attorney, Agent, or Firm* — LUMEN PATENT FIRM

(57) ABSTRACT

A 3D printed micropumping system and method is provided. The micropump incorporates an active electromagnetically actuated valve and two Hall effect sensors. Both uniquely added features allowed for better optimization of the pump's parameters through synchronizing the pumping and valve opening motions. This synchronous motion minimized fluid throttling and optimized the pumping stroke versus valve opening onset to realize the maximum possible flow rate and backpressure per consumed power (i.e., high efficiency). The resulting specific flow rates and backpressure were 11.89 ml/min·W and 693 Pa/W at 10V, respectively, the highest reported values at this scale and actuation method. Moreover, the pump's integration to lab-on-chip devices was experimentally verified. The pump's planar and modular design (i.e., versatility), combined with its efficient performance, low driving voltage, and low power consumption, qualifies it as a viable candidate for battery-operated portable point of care diagnostic chips lab-one-chip, and the emerging body-on-chip devices.

4 Claims, 8 Drawing Sheets

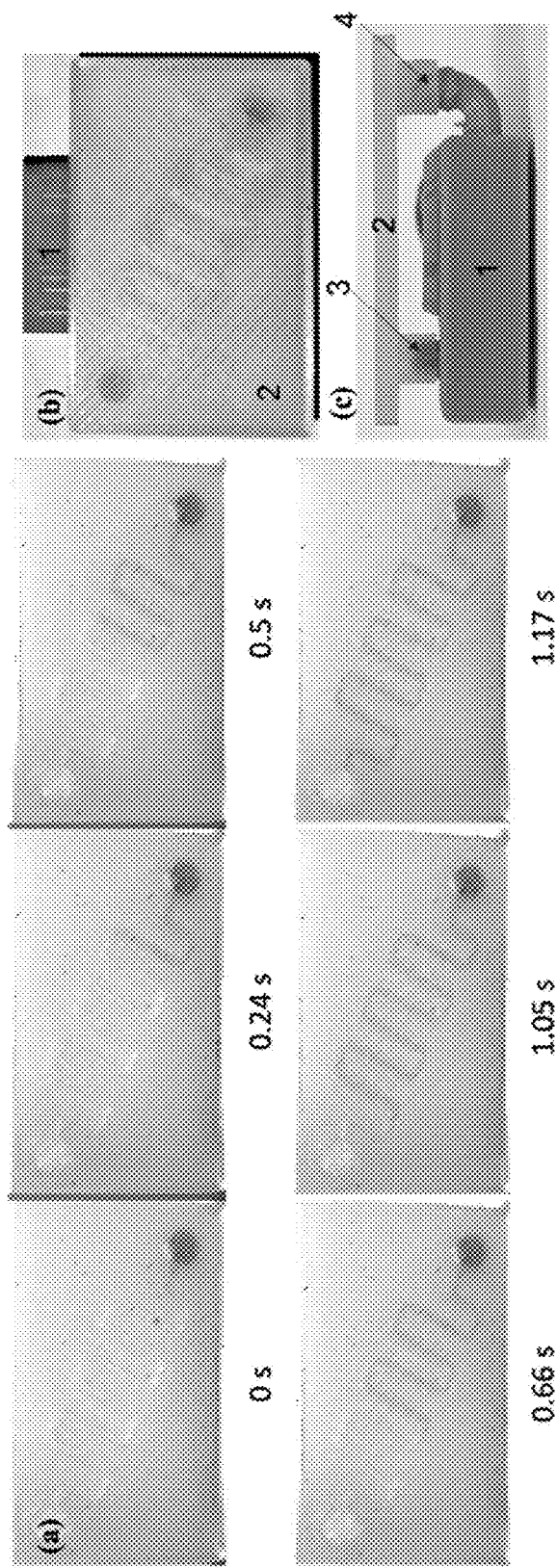
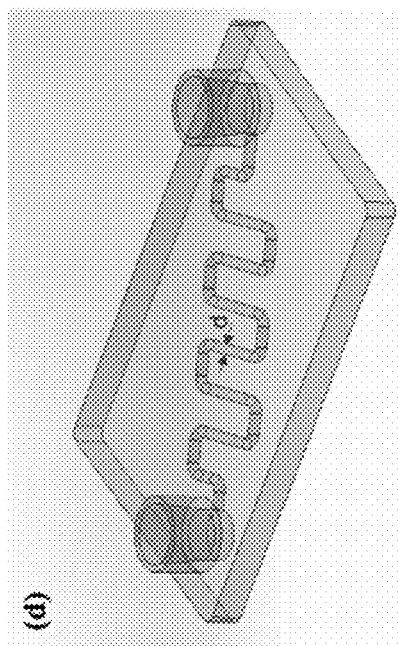
FIG. 8A
FIG. 8B
FIG. 8C
FIG. 8D

ELECTROMAGNETICALLY ACTUATED 3D PRINTED MICROPUMP

CROSS-REFERENCE TO RELATED APPLICATIONS

This application is a continuation of U.S. patent application Ser. No. 18/130,039 filed Apr. 3, 2023, which is incorporated herein by reference. U.S. patent application Ser. No. 18/130,039 claims priority from U.S. Provisional Patent Application 63/331,310 filed Apr. 15, 2022, which is incorporated herein by reference.

FIELD OF THE INVENTION

The invention relates to electromagnetic micropumps.

BACKGROUND OF THE INVENTION

Micropumps are the driving force of microfluidic devices. They can deliver precise fluid volumes along a microchannel while maintaining pressure across it. This ability, paired with a compact, planar design, has made them the perfect candidates for incorporation in biofluid transport, sample mixing, chemical and biological assays, and drug administration. This has thus advanced the fields of medical point of care testing (POCT), micro total analysis systems (TAS), and lab and body-on-chip applications.

However, portability, cost, flow rate, and power consumption are critical limitations for utilizing micropumps in the above-mentioned applications. A high process throughput for biofluid transport, for example, necessitates a sufficiently high flow rate and consistent pressure head. On the other hand, micro-dosing applications require a precisely controlled, relatively low flow rate combined with the ability to overcome considerable backpressures. This indicates that a wide range of flow rates is desirable in versatile micropumps. Current micropump designs typically produce maximum flow rates that range from nanoliters to tens of milliliters per minute. Portability is crucial for microfluidic chip integration. Thus, a geometrically planar micropump allows for seamless attachment to the point of care or lab-on-chip devices. It is also typically essential for micropumps to have a total occupied volume of a few cubic centimeters for incorporation in compact devices. Portability is closely tied to power consumption as a higher power consumption will require a larger battery integrated into the package.

Micropumps can be categorized by the actuation mechanism. Such actuation mechanisms include piezoelectric, thermal, pneumatic, electroosmotic, and electromagnetic actuation. Piezoelectric actuation was extensively used for developing peristaltic micropumps because of their large actuating force, planar structure, and quick response. Nevertheless, piezoelectric actuation requires a high driving voltage (usually higher than 100 V) and a complicated, bulky control circuit that makes circuit and battery integration in a package unfeasible. Several thermally actuated micropumps were developed because of their ability to be scaled down to occupy a small volume, large actuation force, and low operating voltage. However, this type of micropumps suffers from a high current draw, slow response, and heat conductivity to the pumped fluid.

Similarly, pneumatically actuated micropumps were developed because of their small footprint, large actuation force, and simple circuit. However, their external pressurized fluid cylinder requirement renders them impractical for portable applications. Electroosmotic micropumps have also been developed for lab-on-chip applications because their small footprint allows for ease of integration on a chip and the high precision of fluid control that they can achieve. The only caveats with such an actuation mechanism are restricting fluids to electrolytic solutions, high driving voltage, and low flow rate.

Electromagnetically actuated micropumps seem to solve most delineated problems with low power consumption and driving voltage, fast response, and simple control. Recently developed electromagnetically actuated micropumps have not combined high flow rate, low power consumption, and planar geometry. Some developed small footprint micropumps with reasonable power consumption albeit with relatively low flow rates because of their use of passive valves—which throttle the flow rate significantly. On the other hand, others developed an electromagnetically actuated micropump capable of producing a maximum flow rate of 37 ml/min and a maximum backpressure of 1.98 kPa at 2 A current draw. However, the coils utilized in that study were bulky, and the pump could not run under 1.6 A.

Valve incorporation in any of these actuation mechanisms is critical. Various valveless micropumps were developed to occupy a smaller volume by primarily utilizing a nozzle, diffuser, or tesla type shape to restrict fluid flow to one direction. The problem with such designs is that they can only be limited to low flow rate applications because of the friction losses and pressure drop (throttling) induced on the fluid due to the constricting shape of these valves. This is also true for passive valves. On the other hand, active valves have little to no throttling effect on the fluid flow, making them more suitable for high flow rate and high-pressure applications. Designs of active microvalves developed typically utilize an actively actuated deflecting membrane to control fluid flow. However, miniaturizing these valves without sacrificing flow rate is difficult because the actuation mechanism needs to be strong enough to facilitate substantial membrane deflection for a high fluid volume to pass through.

3D printing technology can provide a valuable addition to micropumps and the microfluidics industry. This is primarily because of the easy fabrication of complicated designs in a single print that would otherwise require multiple fabrication steps. The versatility and rapid mobilization characteristic of 3D printing technology can thus allow for widespread, seamless utilization of micropump designs into microfluidic devices anywhere in the world.

SUMMARY OF THE INVENTION

This invention describes the design and characterization of a electromagnetically actuated 3D printed micropump that efficiently employs a synchronized active valve to achieve a high flow rate. The micropump utilizes two elastic membranes attached to magnets in two chambers for the pump and the valve, and a modular design is employed to allow for easy assembly and attachment to a microfluidic chip. The micropump's entire housing is 3D printed by fused deposition modeling to allow for ease of fabrication and flexible adoption to microfluidic applications. A novel idea of incorporating two Hall effect sensors into the pump and valve chambers allowed optimization of the pump's operating parameters and synchronization of the pump's stroke relative to the valve opening onset, which led to minimal throttling and friction losses.

Key features include:
  3D printed, electromagnetically actuated micropump
  Active, electromagnetically actuated valve Integrated Hall-effect sensors to optimize pump stroke relative to the valve motion High flow rate and backpressure at low drive voltage, low power consumption, and small footprint Modular and planar design facilitating the integration with versatile microfluidic devices Proven concept through the integration with a microfluidic device In one embodiment the invention can be described as a method for electromagnetically actuating a micropump. A micropump is made available which has a pump chamber, a valve chamber, a reservoir and a micropump outlet.

The pump chamber has a pump coil, a pump magnet and a pump membrane. The valve chamber has a valve coil, a valve magnet and a valve membrane. A fluidic connect exists between the reservoir, the pump chamber, the valve chamber and the micropump outlet. A synchronizing operation of the micropump control a liquid flow inside the reservoir to be pumped from the pump chamber to the valve chamber and to the micropump outlet. The synchronizing operation of the micropump is repeated at a frequency f. In one example, the micropump further has at least two Hall-effect sensors, and the synchronizing operation of the micropump further comprises using at least one of the Hall-effect sensors for the operation of the pump chamber, and using at least one of the Hall-effect sensors the operation of the valve chamber. The synchronizing distinguishes three stages of pump membrane and valve membrane synchronization:

(i) a first stage comprises simultaneously (j) energizing the pump coil resulting in downward movement of the pump membrane and (jj) energizing the valve coil resulting in upward movement of the valve membrane, resulting in the liquid being pumped from the pump chamber into the valve chamber.

(ii) a second stage comprises simultaneously (k) de-energizing the pump coil resulting in the pump membrane to move to a neutral position and (kk) energizing the valve coil with an opposite polarity resulting in a downward movement of the valve membrane, resulting is fluid movement from the valve chamber to the micropump outlet.

(iii) a third stage comprises de-energizing both the pump coil and the valve coil resulting in both the pump coil to remain in its neutral position and the valve coil moving to its neutral position.

BRIEF DESCRIPTION OF THE DRAWINGS

(FIG. 1A) Exploded view of the assembly. (FIG. 1B) Isometric view of the micropump system. (FIG. 1C) Detailed front section view of bottom system module.

(FIGS. 5A-B) Effect of cycle on-time on the micropump's flow rate and backpressure at 5V, 9V, and 10V shows different optimum on-times that correspond to the membranes' maximum deflection at each voltage. (FIGS. 5C-D) Maximum pump and valve membrane deflections for 5V, 6V, 7V, 9V, and 10V at 20%, 30%, and 40% duty cycles showing an increasing maximum deflection with increasing voltage and duty cycle that ultimately plateaus because the chamber's geometry restricts the membrane from travelling further. (FIGS. 5E-F) Maximum micropump flow rate and backpressure at different voltages and 20%, 30%, and 40% duty cycles showing an almost linear relationship at this voltage range.

(FIG. 7A) Minimal effect of frequency on power consumption. (FIG. 7B) Flow rate versus frequency showing an optimum frequency for maximum flow rate. (FIG. 7C) Flow rate and (FIG. 7D) backpressure versus power consumption illustrating the tradeoff between power, backpressure, and flow rate at 5 and 10V.

FIGS. 8A-D show according to an exemplary embodiment of the invention (FIG. 8A) Flow of dyed fluid in a microchannel (d=1000 μm) driven by the proposed micropump. (FIG. 8B) Top, and (FIG. 8C) front views of the pump attached to the chip containing the microfluidic channel with 1—micropump, 2—microfluidic chip, 3—micropump inlet, 4—micropump outlet. (FIG. 8D) CAD model of the microfluidic chip, where d is the channel diameter ranging from 400 μm-1000 μm.

DETAILED DESCRIPTION

A compact, 3D printed planar electromagnetically actuated micropump with an electromagnetic synchronized active valve. The pump and valve chambers utilize the idea of Hall effect sensor integration to optimize their strokes and automatically establish a synchronous pump-valve motion. An elastic material is utilized to fabricate these membranes, and the rest of the micropump's body is entirely 3D printed. This resulted in a modular, portable, and unique design seamlessly assembled into a microfluidic chip. This design is examined in detail, and the backpressure and flow rate of the micropump is then characterized across an array of driving voltages, frequencies, and duty cycles. The pump is finally fitted to a microfluidic chip to demonstrate its functionality. The optimal parameters at which each of these values was realized are closely analyzed and discussed.

Design and Principle of Operation

Overall System Design

Figure 1A:
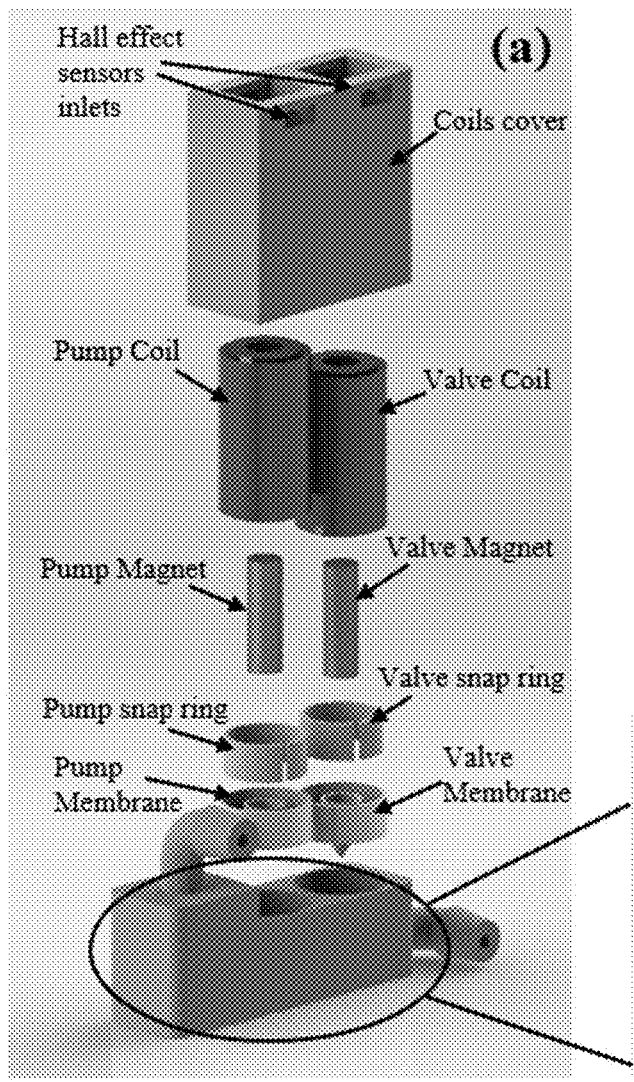
FIGS. 1A-C show according to an exemplary embodiment of the invention the micropump system assembly.
Figure 1B:
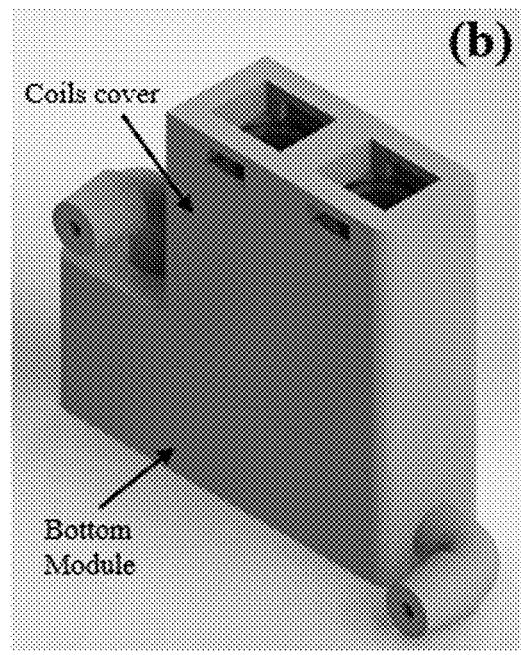
Figure 1C:
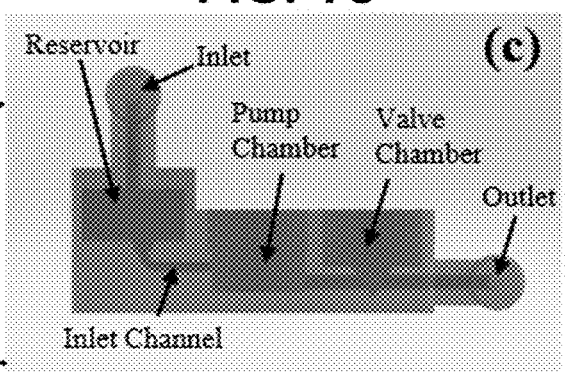

FIG. 1A shows an exploded isometric view of the entire system assembly. The system has two main chambers: a pump chamber and a valve chamber, in one embodiment each with a diameter of 9.7 mm. The chambers' respective membranes are fixed inside them with internal snap rings. This allows the elastic membranes' walls to be tightly pushed towards the chambers' walls. The membranes' elasticity ensures that they take the shape of chambers' walls as they are pushed towards it, preventing liquid leakage towards the coils. In one example, the entire system measures 20×30×10.5 mm³, and the assembled pump model is depicted in FIG. 1B. The inlet and outlet channels in the bottom module shown in FIG. 1C are 1 mm and 1.5 mm in diameter, respectively. The inlet orifice substitutes the need for an inlet valve, and its diameter was optimized against forward pressure and flow rate. A reservoir positioned 2.5 mm higher than the pump chamber is incorporated into the micropump's design to fill the pump chamber continuously.

The magnets used are N52 cylindrical neodymium magnets 4 mm in diameter and 12 mm in height for the valve and the pump chambers. The magnets are fixed to the center of their respective membranes to maximize each membrane deflection. The coils in each chamber are also identical, with a height of 17 mm, 9.5 mm outer diameter, 5 mm inner diameter, and AWG 33 wires. Two Hall effect sensors are attached to the system's top cover to determine the instantaneous distance between the sensors and the pump and valve chambers' magnets to obtain online position data, which can be utilized to estimate each membrane deflection and speed during the system's operation.

The valve membrane is designed with a conical protrusion from its bottom to maximize the surface area of the membrane exposed to the 1.5 mm outlet channel. The polymeric material of the valve's membrane allows this conical protrusion to snap into the valve seat, providing a watertight sealing and preventing leakage. The conical design also ensures that any slight lateral movement during the membrane deflections does not offset the protrusion from fitting in its seat.

Pump-Valve Synchronous Motion

Figure 2:
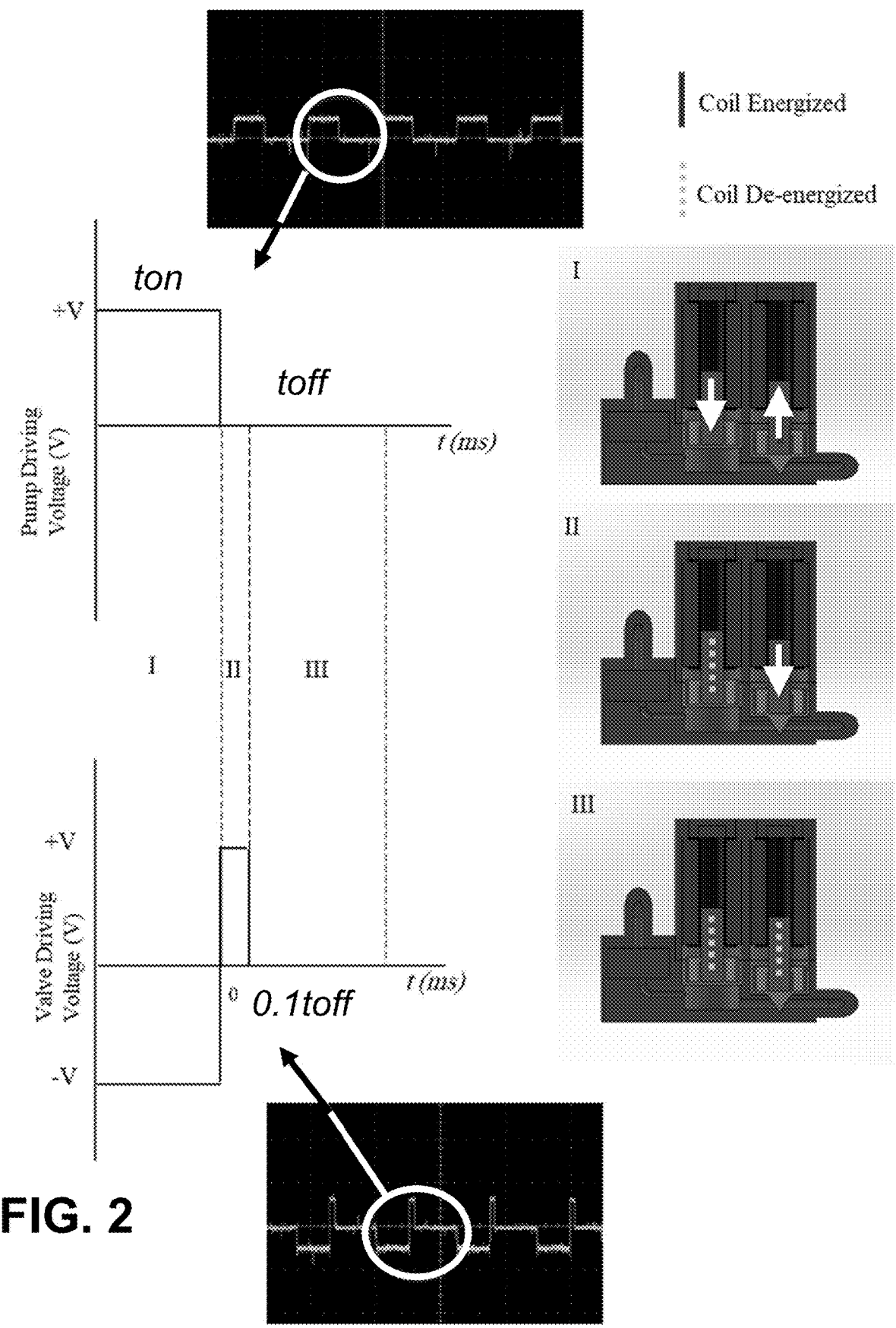
FIG. 2 shows according to an exemplary embodiment of the invention the three stages of pump and valve membranes synchronization. Stage I: pump coil energized (membrane is pushed down) and valve coil energized (membrane is pulled up). Stage II: pump coil de-energized (membrane is back to its neutral position) and valve coil energized with opposite polarity (membrane is pushed down). Stage III: pump and valve coils are de-energized (membranes are back in their neutral positions).

The principle of operation of the micropump is described as follows: the pump and valve coils are energized in certain combinations to allow the liquid inside the pump's reservoir to be pumped from the pump chamber to the valve chamber to the micropump's outlet. The synchronization of the pump and valve membranes, which are split into three stages, as shown in FIG. 2. Each cycle begins by energizing the pump and valve coils simultaneously (stage 1). The applied voltage pushes the pump chamber's membrane downwards and simultaneously pulls the valve chamber's membrane upwards. This pumps the fluid out of the pumping chamber into the valve chamber. The duration for which this position is kept is labeled $t_{on}$. Stage 2 then follows by simultaneously de-energizing the pump chamber's coil for a duration 0.1 $t_{off}$ and energizing the valve chamber's coil with opposite polarity for 0.1 $t_{off}$. This serves to push any remaining fluid inside the valve chamber outside the micropump. This marks the beginning of stage 3, where the valve and pump chambers' coils are finally de-energized for 0.9 $t_{off}$ to conserve energy. Each of these cycles is then repeated for a frequency f, and the duty cycle at which the entire system operates is defined in Eq. (1) where:

$$\text{Duty Cycle} = \frac{t_{on}}{t_{on} + t_{off}} \quad (1)$$

Hall Effect Sensors Integration

The instantaneous distance between each magnet and its respective Hall effect sensor is determined by converting the detected magnetic field to a distance. For a cylindrical magnet, this relationship is shown in Eq. 2:

$$B = \frac{B_r}{2} \left( \frac{x+L}{\sqrt{R^2 + (x+L)^2}} - \frac{x}{\sqrt{R^2 + x^2}} \right) \quad (2)$$

Where x is the distance between the top of the magnet and the Hall effect sensor, $B_r$ is the remanence of the magnetic material (about 1.45 T for N52 magnets), R is the magnet's radius (2 mm), and B is the detected magnetic field. The variation in the detected magnetic over time is monitored until the magnet is no longer moving (i.e., $$\frac{\Delta B}{\Delta t} = 0 \Big).$$

This indicates that the membrane is stretched to its maximum deflection, indicating that applying a driving voltage for a $t_{on}$ beyond that time is unnecessary.

Materials and Methods

Circuit and Control

A dual-channel motor driver chip (L293D) provided the necessary power and polarity to the valve and pump coils. Power was provided to the motor driver via a DC variable power supply (Kungber SPS3010) to experiment with different voltages. An Arduino Uno microcontroller coordinated the control signals to the motor driver to drive both coils because of its easy interface and prototyping prowess. It was also used to obtain analog readings from the linear Hall effect sensors (DRV5055A1QDBZR) and perform the necessary calculations to convert these readings into distances. The micropump's power consumption was measured via an oscilloscope (Tektronix MIDO3024) connected across two 0.5Ω 10 W shunt resistors connected in series with each pump and valve coils.

Fabrication and Assembly

The micropump's coils' cover, internal snap rings, bottom module, the molds for the valve and pump membranes, and the microfluidic channel were all 3D printed from PLA Plus (eSUN) by Fused Deposition Modelling (FDM) using a Creality CR-10 Smart printer. Table 1 delineates the parameters used for 3D printing these components.

TABLE 1

Parameters of pump's 3D printed parts

| Parameter | Value |
| --- | --- |
| 3D Printing Method | Fused deposition modeling (FDM) |
| Material | PLA Plus |
| Layer height [μm] | 160 |
| Nozzle temperature [° C.] | 205 |
| Bed temperature [° C.] | 60 |
| Printing speed [mm/s] | 50 |

The valve and pump membranes were molded from Ecoflex 00-30 platinum silicone because of its biocompatibility, excellent stiffness, and high elongation percentage at break. About 3 g of Ecoflex 00-30 was placed in a vacuum chamber for 15 minutes to remove entrapped air bubbles in the solution. This was followed by pouring the Ecoflex in the 3D printed molds and placing the molds in a furnace at 60° C. for 30 minutes.

Figure 3:
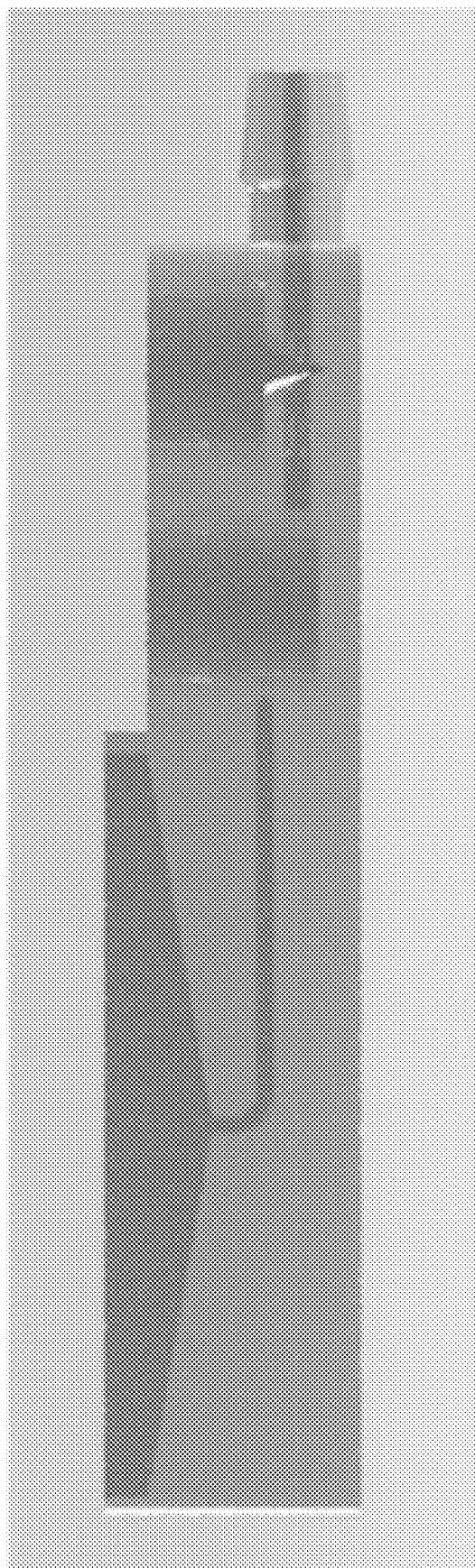
FIG. 3 show according to an exemplary embodiment of the invention a CAD model of flow rate and pressure testing reservoir.

The magnets were fixed to the Ecoflex membranes by an adhesive (Akfix® 705), and the membrane-magnet assemblies were placed inside their respective chambers and fitted with their internal snap rings (See FIG. 3b in Appendix A of provisional Application 63/331310 to which this application claims priority). The coils are snuggly fitted into the top cover, and the top cover and bottom module are fixed together by an adhesive (Akfix705). See FIG. 3b in Appendix A of provisional Application 63/331310 to which this application claims priority which shows the final assembled system.

Flow Rate and Pressure Characterization

The flow rate was characterized by monitoring the micropump's average time to empty its reservoir. Water was used as the testing fluid for flow rate and backpressure characterization experiments. A unique reservoir was incorporated into the micropump to make flow rate and pressure testing easier for testing purposes. The reservoir was designed with the shape of an inverted triangle (See FIG. 4a in Appendix A of Provisional Application 63/331310 to which this application claims priority) with a larger base and the same height as the original reservoir to ensure a consistent head for a larger volume. The inverted triangle shape ensured that all of the water in the reservoir was emptied, and the larger volume allowed for a longer testing period. A 120 μm layer height was employed to fabricate this reservoir to ensure a smooth transition for the water into the pump chamber. The experimental setup for flow rate, power, and Hall effect sensors evaluation is depicted in FIG. 4a in Appendix A of Provisional Application 63/331310 to which this application claims priority.

The same testing reservoir was also utilized for backpressure characterization. At each condition, the micropump's maximum backpressure was determined by attaching a vertical graduated tube to the micropump's outlet, turning on the micropump, and recording the supported water's height. A similar approach was undertaken in the inlet orifice diameter optimization experiment. A vertical graduated tube was attached to the micropump's inlet. The tube was then gradually filled with water to the point where the inlet diameter could let water through. The water height at that point was then recorded as the maximum forward pressure that each orifice diameter could withstand.

Results

Inlet Orifice Diameter Optimization

Figure 4:
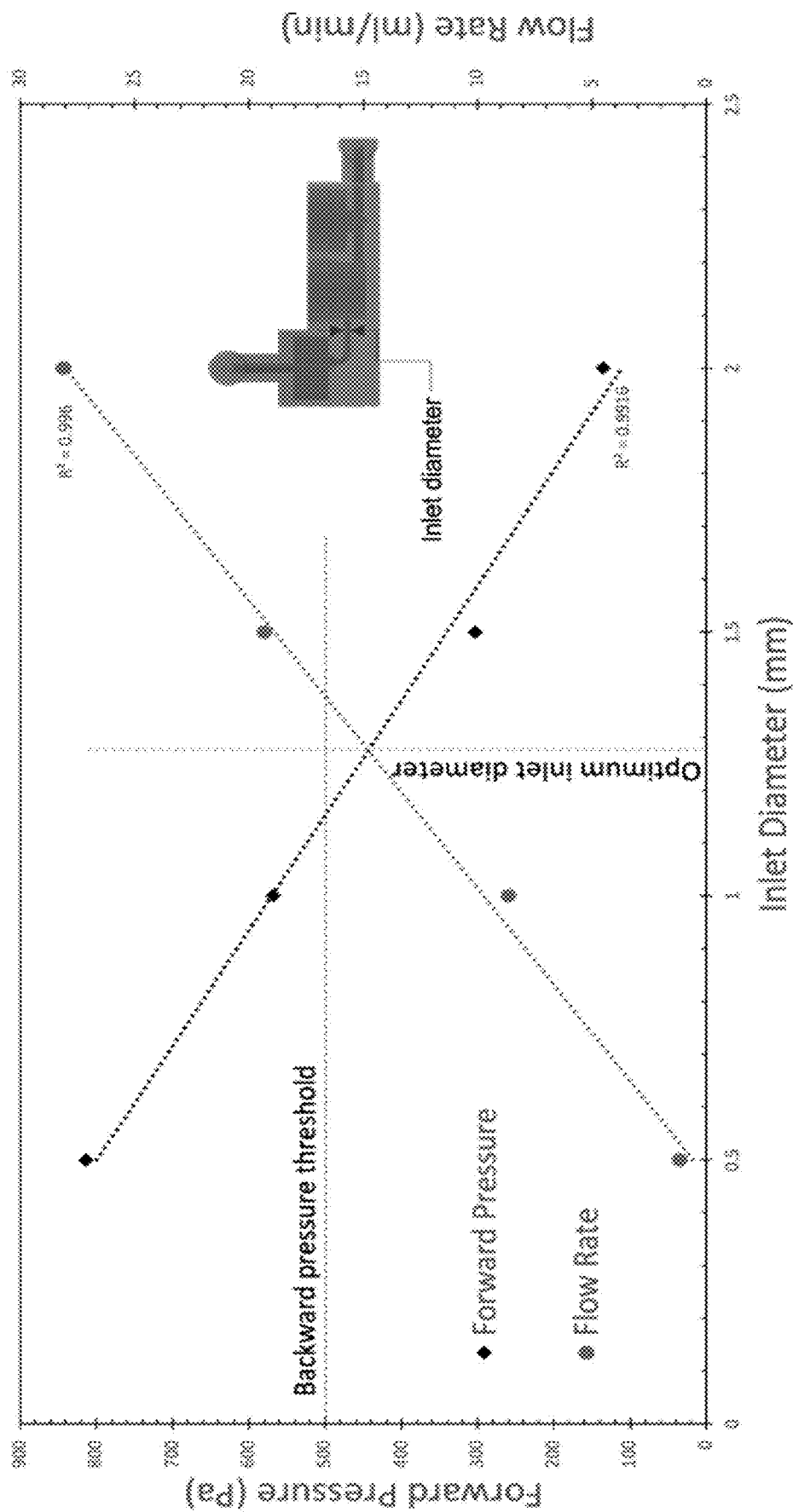
FIG. 4 shows according to an exemplary embodiment of the invention optimization of the pump's valveless inlet diameter showing a theoretical optimal value at the intercept of the forward pressure and flow rate curves at 1.25 mm. The backpressure threshold at 496 Pa constrained it to be <1.1 mm.

The bottom module's valveless inlet diameter was optimized by evaluating the forward pressure and flow rate for four inlet orifice diameters: 0.5 mm, 1.0 mm, 1.5 mm, and 2.0 mm. This relationship is shown in FIG. 4. The forward pressure head increases with decreasing orifice diameter, which is favorable for reducing backflow into the reservoir. However, the friction losses also increase with decreasing orifice diameter, resulting in a lower flow rate for smaller inlet diameters. This suggests that an optimum inlet diameter value exists. Plotting the relationship between forward pressure and flow rate against the different inlet diameters showed an intersection (the optimum value) at ~1.25 mm. However, the withstanding backpressure of 496 Pa constrained the diameter to be less than 1.1 mm. The orifice diameter was thus chosen as 1 mm.

Pump and Valve Membrane Deflections

Figure 5A:
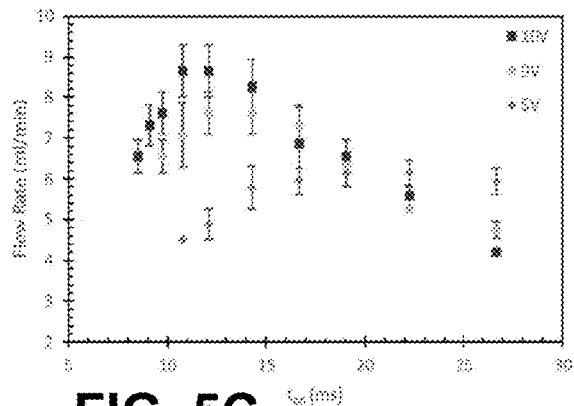
FIGS. 5A-F show according to an exemplary embodiment of the invention characterization of pump and valve membrane deflections.
Figure 5B:
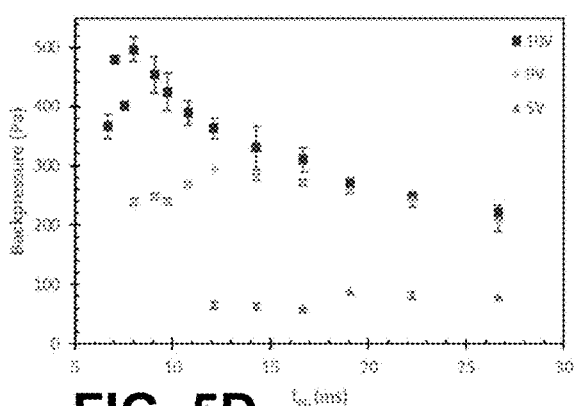

FIGS. 5A-B show the flow rate and backpressure versus cycle on time ($t_{on}$) at different drive voltages, respectively. The figures show that the pump membrane's maximum deflection can be attained at around 13 ms at 10V, where the maximum flow rate and backpressure are realized. This optimum $t_{on}$ implies that at lower frequencies where $t_{on}$ is unnecessarily long, the power consumption must be higher because the membrane is held at the deflected position for a longer time. A $t_{on}$ shorter than the optimum value causes the membrane to vibrate at a rate that does not allow it to reach that maximum deflection, and thus flow rate starts to decrease.

Figure 5C:
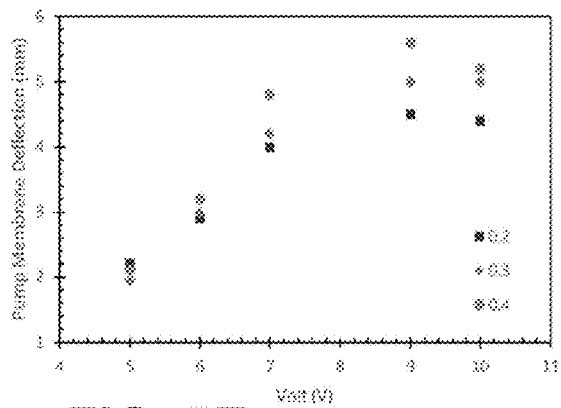
Figure 5D:
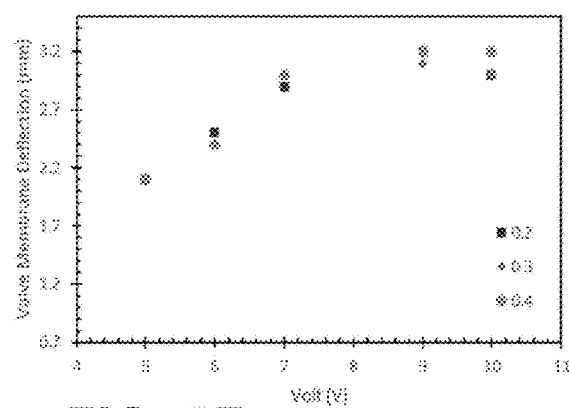
Figure 5E:
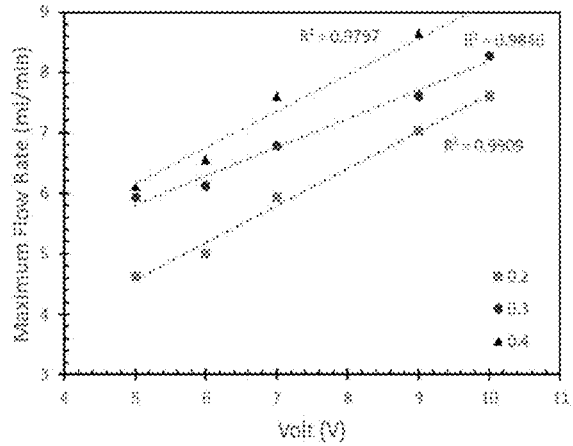
Figure 5F:
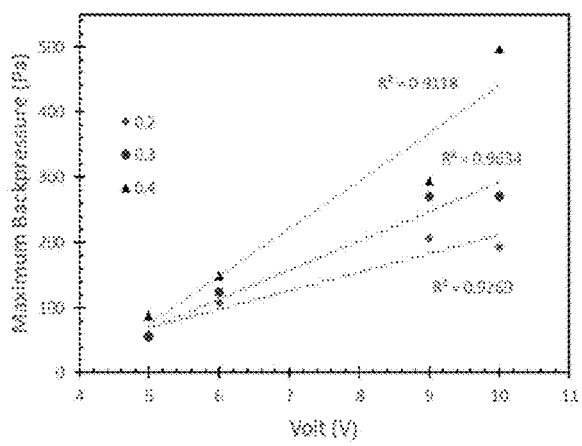

FIGS. 5C-D show the pump and valve membrane deflection versus driving voltage at different duty cycles, respectively. The figures show that membrane deflection increases with higher voltages and higher duty cycles until it plateaus after 9V. This increase can be attributed to the higher force applied by a higher voltage and the longer time the membrane is allowed to deflect at higher duty cycles. The slight drop observed at 40% duty cycle at 10V is because the maximum flow rate at these parameters was obtained at a higher frequency (33 Hz) than that of the points before it (28 Hz at 9V), and thus the shorter on-time did not allow the membrane to stretch as much. This gives rise to the notion that a tradeoff between membrane deflection and on-time exists for which maximum flow rate and backpressure can be realized. Nevertheless, the flow rate and backpressure increase with increasing voltage in the range of voltages of interest, as shown in FIGS. 5E-F. This is no surprise because the higher voltage drives a higher current through the coils, resulting in a higher force and acceleration for the magnets, which ultimately causes a faster, stronger push on the fluid.

It is worth noting that the flow rate could theoretically be estimated by Eq. (3):

$$Q = V_{disp} * f \qquad (3)$$

Where Q is the theoretical flow rate, $V_{disp}$ is the displaced volume per stroke in the pump chamber, and f is the operating frequency of the micropump. The displaced volume per stroke is simply the difference in shape of the membrane before and after each stroke, which is rather difficult to estimate or simulate because the data from the Hall effect sensors only provide the position of the magnet (which is the point of maximum deflection) but not its orientation which slightly changes during the magnets' movement.

Verification of Valve Synchronization

Figure 6:
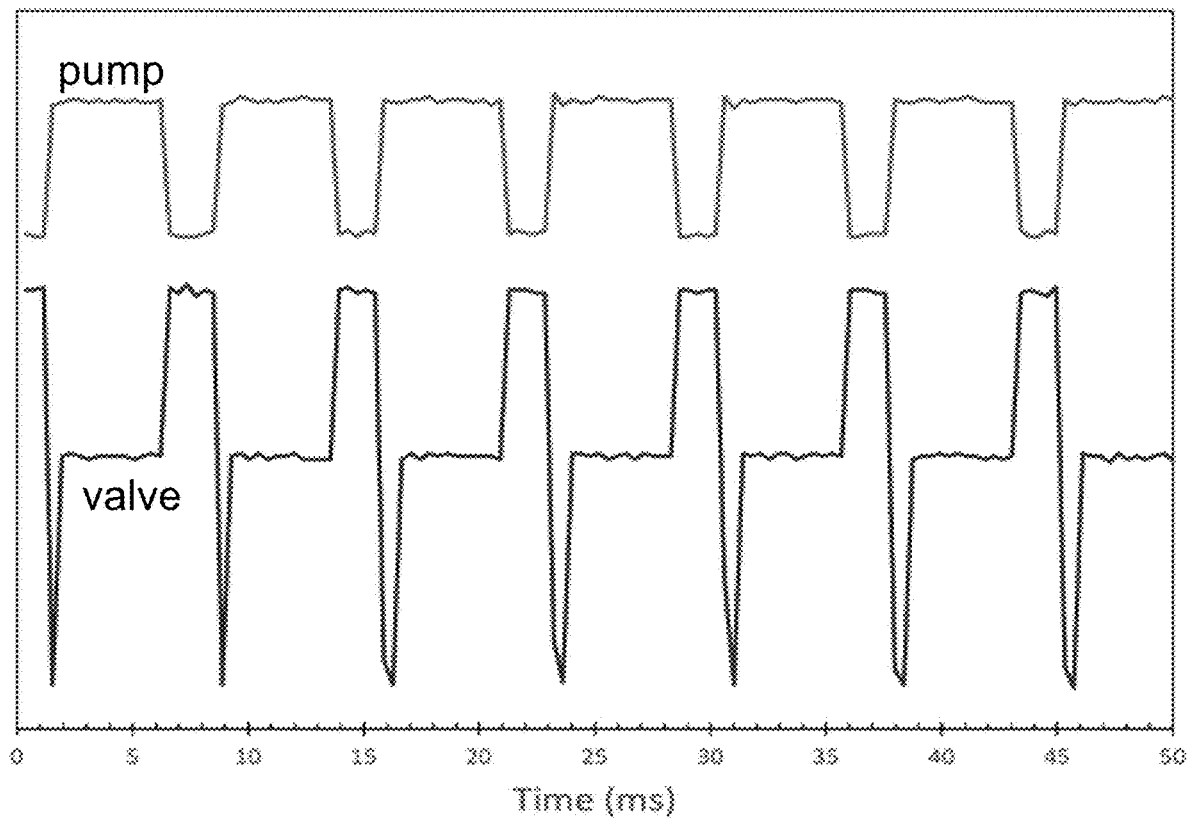
FIG. 6 shows according to an exemplary embodiment of the invention Hall effect sensors' output for the pump and the valve at 5V and 30% duty cycle indicating a precise synchronous motion through the full cycle.

The attached Hall effect sensors verify the synchronous motion between the pump and valve membranes. FIG. 6 shows the sensors' output signal when the pump is operated at 5V and 30% duty cycle. The figure clearly shows that synchronous motion is realized precisely as expected: the pump and valve membranes deflect at the same time for 30% of the cycle, and they both return to their undeflected positions after the valve membrane is actuated to force any remaining fluid in the valve chamber.

Drive Frequency and Power Consumption

Figure 7B:
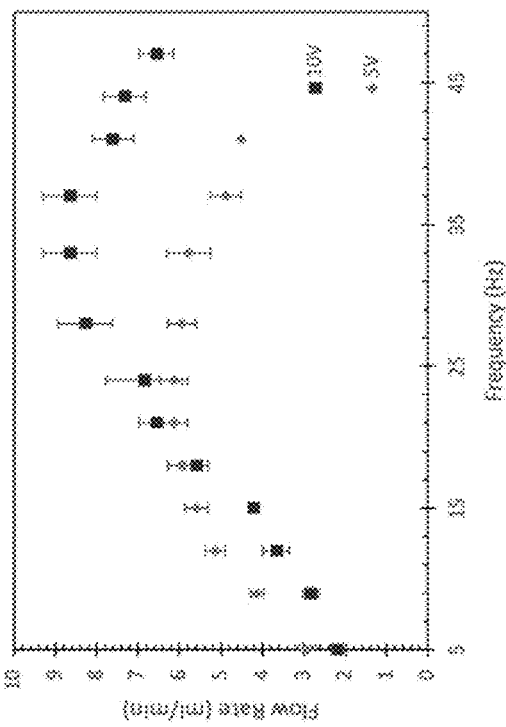
FIGS. 7A-D show according to an exemplary embodiment of the invention the behavior of micropump power consumption and flow rate at driving voltages of 5V and 10V.
Figure 7D:
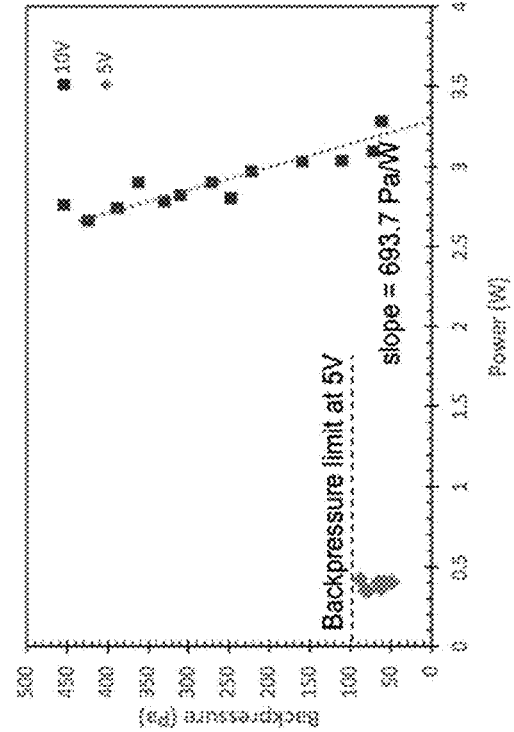
Figure 7A:
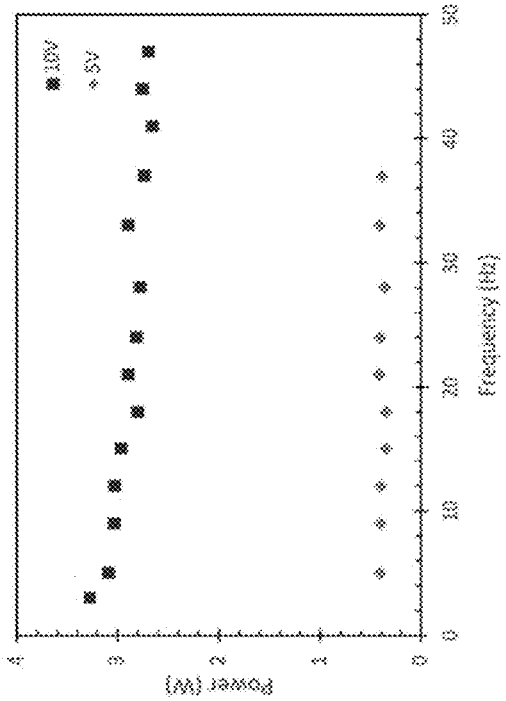
Figure 7C:
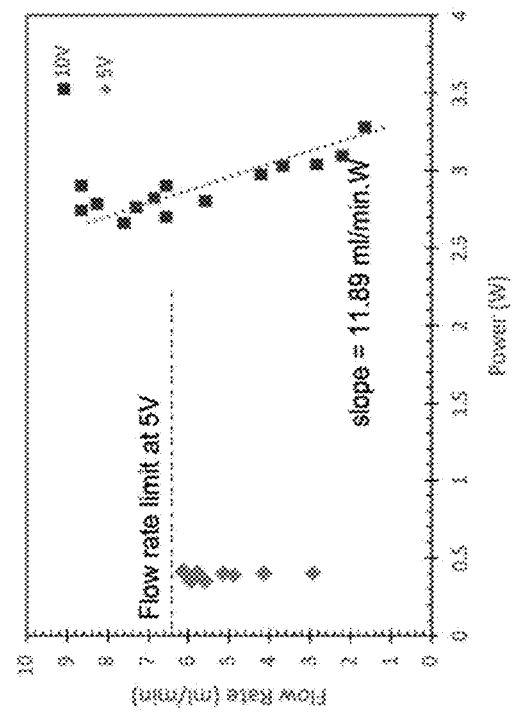

FIG. 7A shows that drive frequency had a minimum effect on power consumption, whereas FIG. 7B shows that higher flow rates are achievable at higher frequencies. However, beyond a specific frequency threshold variable with drive voltage, the flow rates decrease again because of the shorter on-times, leading to smaller pump and valve membrane deflections. FIGS. 7C-D delineate the consumed power at different flow rates and backpressures at 5V and 10V, respectively. The figures show that up to 6 ml/min can be attainted at less than 0.5 W at 5V driving voltage at maximum backpressure of 100 Pa. However, higher driving voltages can be employed if higher flow rates or higher backpressures (up to 496 Pa) are desirable. The figures also show a specific flow rate (i.e., the flow rate per unit power) of 11.89 ml/min·W and specific backpressure of 693.7 Pa/W at 10V. These are the highest reported values for this pump actuation method and size, which can be attributed to the synchronous motion of the active valve leading to (1)

minimum or zero flow throttling, and (2) the optimization of the pumping stroke relative to valve opening onset. This can also be attributed to the efficient design that allowed the integration of powerful magnets and coils within a small footprint.

Microfluidic Device Integration

The pump's planar design, small footprint, high backpressure, and flow rate qualifies it as a favorable solution for microfluidic lab and body-on-chip applications. To verify that, the pump was attached to a microfluidic channel with channel diameters ranging from 400-1000 µm (FIGS. 8A-D). The pump successfully drove and circulated the fluid in the channels (simulating a beating heart), as shown in FIG. 8A. This verifies that the micropump can generate a high flow rate and backpressure for high throughput microfluidic applications.

What is claimed is:

1. A method for electromagnetically actuating a micropump, comprising:
   (a) having a micropump, wherein the micropump comprises a pump chamber, a valve chamber, a reservoir, a pump chamber inlet channel with an input orifice and a micropump outlet channel with an output orifice, wherein the input orifice has a diameter which is smaller than a diameter of the output orifice, wherein the pump chamber has a pump coil, a pump magnet, a pump membrane, and a pump snap ring, wherein the valve chamber has a valve coil, a valve magnet, a valve membrane with a conical protrusion, and a valve snap ring, and wherein a fluidic connect exists between the reservoir, the pump chamber, the valve chamber and the micropump outlet; and
   (b) synchronizing operation of the micropump to control a liquid flow inside the reservoir to be pumped from the pump chamber to the valve chamber and to the micropump outlet, wherein the synchronizing distinguishes three stages of pump membrane and valve membrane synchronization, wherein:
   (i) a first stage comprises simultaneously (j) energizing the pump coil resulting in downward movement of the pump membrane and (jj) energizing the valve coil resulting in upward movement of the valve membrane, resulting in the liquid being pumped from the pump chamber into the valve chamber;
   (ii) a second stage comprises simultaneously (k) de-energizing the pump coil resulting in the pump membrane to move to a neutral position and (kk) energizing the valve coil with an opposite polarity resulting in a downward movement of the valve membrane, resulting is fluid movement from the valve chamber to the micropump outlet, and
   (iii) a third stage comprises de-energizing both the pump coil and the valve coil resulting in both the pump coil to remain in its neutral position and the valve coil moving to its neutral position.

2. The method as set forth in claim 1, wherein the synchronizing operation of the micropump is repeated at a frequency f.

3. The method as set forth in claim 1, wherein the micropump further comprises at least two Hall-effect sensors, and wherein the synchronizing operation of the micropump further comprises using at least one of the Hall-effect sensors for the operation of the pump chamber, and using at least one of the Hall-effect sensors the operation of the valve chamber.

4. The method as set forth in claim 1, wherein the micropump consisting of a dual chamber with the pump chamber and the valve chamber and integrated with the dual chamber the reservoir.

\* \* \* \* \*